United States Patent
Eberle

[19]

[11] Patent Number: 5,983,803
[45] Date of Patent: Nov. 16, 1999

[54] ARTICLE TRANSPORT ASSEMBLY

[75] Inventor: Jürg Eberle, Hinwil, Switzerland

[73] Assignee: IPT Weinfelden AG, Weinfelden, Switzerland

[21] Appl. No.: 09/016,068

[22] Filed: Jan. 30, 1998

[30] Foreign Application Priority Data

Jan. 31, 1997 [CH] Switzerland .............................. 0221/97

[51] Int. Cl.⁶ .................................................. B61F 9/00
[52] U.S. Cl. ........................... 105/150; 105/154; 104/93; 16/102; 16/106
[58] Field of Search ................... 105/141, 144, 105/148, 150, 154; 104/89, 93, 95, 118, 119; 198/678.1; 16/91, 97, 102, 106, 107

[56] References Cited

U.S. PATENT DOCUMENTS

| | | |
|---|---|---|
| 3,155,051 | 11/1964 | Sherburne . |
| 3,610,167 | 9/1969 | Hasselmann ............................. 105/154 |
| 3,696,890 | 10/1972 | Armstrong . |
| 4,351,241 | 9/1982 | Brems et al. . |
| 4,423,685 | 1/1984 | Kerckhoff ................................ 105/150 |

FOREIGN PATENT DOCUMENTS

| | | |
|---|---|---|
| 0 387 318 | 8/1989 | European Pat. Off. . |
| 2 458 213 | 1/1981 | France . |
| 2 502106 | 9/1982 | France . |
| 247498 | 3/1912 | Germany ................................ 105/154 |
| 458887 | 8/1950 | Italy ........................................ 105/154 |
| 12819 | 1/1924 | Netherlands ........................... 105/154 |
| 382768 | 12/1964 | Switzerland . |

*Primary Examiner*—Mark T. Le
*Attorney, Agent, or Firm*—Alston & Bird LLP

[57] ABSTRACT

An article transport assembly which is particularly designed for the conveyance of articles such as printing products, and which comprises a guide rail, and a plurality of article transport devices mounted for movement along the guide rail. Each transport device comprises a U-shaped transport body having a base leg and the two upright side legs, and with a gripper for engaging a printing product attached to the base leg. The two side legs each mount a pair of guide rail engaging members, with the two pairs of guide rail engaging members being positioned to engage both sides of the guide rail at two longitudinally spaced apart locations, and so as to permit the guide rail engaging members to move along the guide rail essentially free of play.

17 Claims, 6 Drawing Sheets

ARTICLE TRANSPORT ASSEMBLY

BACKGROUND OF THE INVENTION

The present invention relates to an article transport assembly for the conveyance of articles such as printed products, and which includes a guide rail supporting a plurality of transport devices which are individually movable along the guide rail and which in turn support the printed products.

The patent specification CH-A-382,768 discloses a transport system for printing products, which comprises a plurality of individually movable article transport devices, designed as carriages, which are mounted on an endless guide rail. Arranged on each article transport device is a gripper which can be actuated via a control and in each case grasps a printing product at a feed station, transports it and releases it again at a delivery point. The empty article transport devices are supplied again, along the guide rail, to the feed station, where they grasp a new printing product. These known devices are of relatively large and heavy design, the disadvantage of this being that the printing products can only be conveyed at low speed, and that they are at a relatively large distance from one another in the conveying stream, thus limiting the conveying capacity of the transport system.

It is an object of the present invention to provide an article of transport assembly of the described type which overcomes the above noted deficiencies of the prior systems.

SUMMARY OF THE INVENTION

The above and other objects and advantages of the invention are achieved by the provision of an article transport device which comprises a generally U-shaped body comprising a base leg and two side legs extending in an upright direction from the base leg. The base leg defines a transverse direction extending between the two side legs and a longitudinal direction which is perpendicular to the transverse direction and to the upright direction. Also, the side legs have respective inside surfaces which face each other in the transverse direction, and a pair of guide rail engaging members is mounted to the inside surface of each of the side legs. Each pair of guide rail engaging members is offset from each other in both the longitudinal and upright directions so as to define a leading member and a trailing member, with the leading members of the two pairs being substantially aligned and spaced apart from each other in the upright direction so as to be adapted to closely receive a guide rail therebetween. The trailing members of the two pairs are longitudinally spaced from the leading members and substantially aligned and spaced apart from each other in the upright direction so as to be adapted to also closely receive the guide rail therebetween. In one embodiment of the invention, the guide rail engaging members are designed as slides which slide along the guide rail. In a preferred embodiment, the guide rail engaging members take the form of wheels.

The transport system according to the invention comprises a plurality of the article transport devices which are arranged on at least one guide rail and which can be conveyed in the direction of the run of the guide rail. Where the guide rail engaging members comprise wheels, the wheels of the individual devices rest on the guide rail on both sides, and the wheels advantageously have a flange and are operatively connected to the guide rail in an externally guided manner, in order to prevent a transverse movement of the devices relative to the guide rail. Apart from maintenance purposes, each article transport device is connected unremovably to the guide rail forming the guide system and can be conveyed safely in any desired direction of run of the guide rail, in particular even in the vertical direction. If, for example, the guide rail runs horizontally, two wheels of a transport device rest on top of the guide rail, while the two remaining wheels are arranged below the guide rail. A holding means, such as a gripper, which serves for grasping and releasing a printing product, is fastened to each article transport device according to the invention.

The article transport device according to the invention has the advantage of a design which is very short in relation to the conveying direction, thus making it possible, for example, for printing products, which in each case are held individually on the gripper of the device, to be conveyed at a short distance from one another or in close succession. Although the transport device according to the invention has a very short wheel base in relation to the conveying direction, it may be nevertheless mounted and guided, essentially free of play, on the guide rail, due to the selected arrangement of the wheels or sliding members. This makes it possible, in particular, to convey safely even heavy loads or loads held asymmetrically by the gripper, ensuring that, even under a conveyed load of this type, the transport device neither jumps out of the guide rail nor is tilted or even jammed relative to the guide rail. A further advantage is to be seen in that the transport device can be conveyed without difficulty in the case of the most diverse curve profiles of the guide rail, even in the case of very small radii of curvature.

In an advantageous embodiment of the transport device, the body has specially designed contact portions, on which two transport devices, arranged one after the other on the guide rail, can touch one another. An advantage of this design is to be seen in that a chain of transport devices which touch one another can be formed. Thus, for example in the case of a guide rail running on an ascending gradient, a chain of transport devices arranged loosely against one another can be formed, with the transport devices arranged in the rear portion of the chain being moved actively by a conveying means, and with the front transport devices being pushed by those at the rear. Thus, as long as an operative connection is made between the transport devices by the ascending guide rail, the transport devices form a kind of chain with loose chain links.

In a preferred embodiment, the two legs of the U-shaped transport body are arranged so as to be offset mirror symmetrically in the conveying direction and in the direction opposite to the conveying direction, so that the wheels held by the legs of the body do not touch one another.

BRIEF DESCRIPTION OF THE DRAWINGS

Some of the objects and advantages of the present invention having been stated, others will appear as the description proceeds, when considered together with the accompanying drawings, in which.

DETAILED DESCRIPTION OF THE PREFERRED EMBODIMENTS

Figure 1:
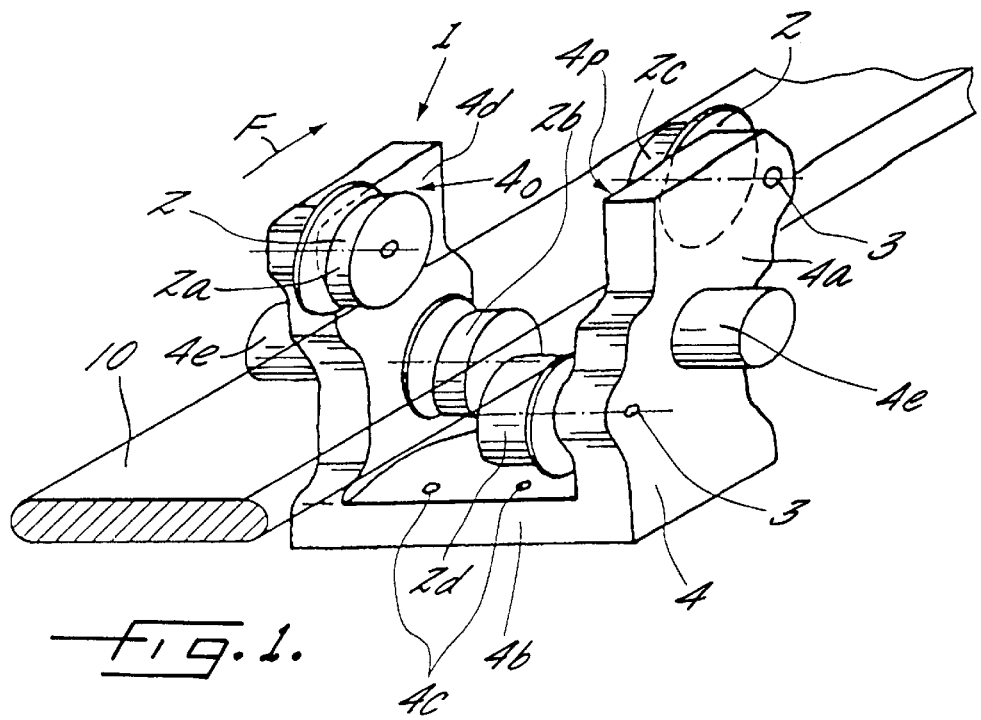
FIG. 1 is a perspective view of an article transport device which embodies the present invention.

FIG. 1 is a perspective view of an article transport device 1 which has a U-shaped transport body 4 which is composed of a base leg 4b and two side legs 4a, 4d extending in an upright direction from the base leg. The base leg 4b defines a transverse direction extending between the two side legs, and a longitudinal direction which is perpendicular to the transverse direction and to the upright direction. As will become apparent, the longitudinal direction corresponds to the conveying direction F. Guide rail engaging members 2, shown here as wheels 2a, 2b, 2c, 2d, are arranged on the two side legs 4a, 4d of the body.

A pair of axles 3 are mounted to the inside surface 4o, 4p of each of the side legs, and the axles each rotatably mount one of the wheels so that the pair of wheels of each leg are offset from each other in both the longitudinal and upright directions. The wheels of each pair may thus be said to define a leading wheel (2b and 2c in FIG. 5) and a trailing wheel (2a and 2d), and the leading wheels (2b, 2c) of the two pairs are substantially aligned and spaced apart from each other in the upright direction so as to closely receive a guide rail 10 therebetween. Likewise, the trailing wheels (2a, 2d) of the two pairs are longitudinally spaced from the leading wheels and substantially aligned and spaced apart from each other in the upright direction so as to closely receive the guide rail 10 therebetween. The guide rail 10 is illustrated transparently in FIG. 1 and is contained on both sides by the wheels 2a, 2b, 2c, 2d, so that the article transport device 1, designed as a carriage, follows the guide rail 10 in a guided manner. The four wheels 2a, 2b, 2c, 2d are arranged, in each case so as to be offset crosswise and diametrically opposite one another, on the surfaces 4o, 4p assigned to and opposite one another, so that the carriage 1 is mounted movably in the conveying direction F or in the direction opposite to the conveying direction F and surrounds the guide rail 10 completely or in a manner largely free of play.

Figure 2:
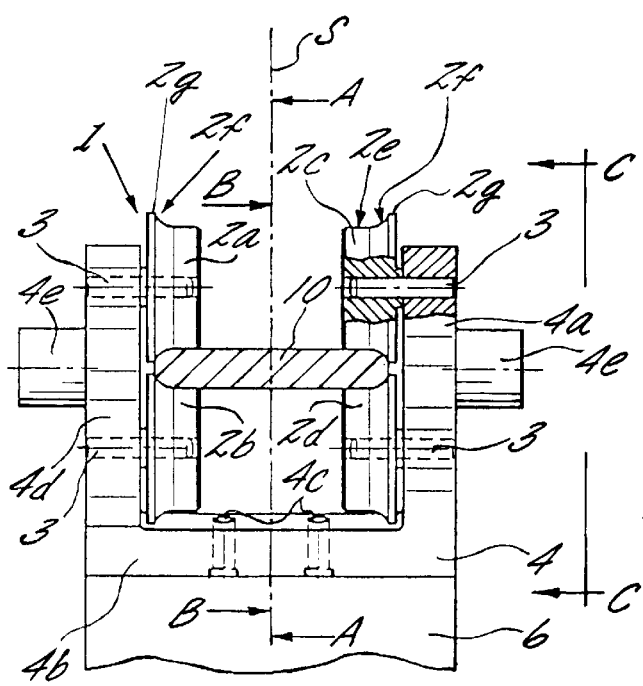
FIG. 2 is a front view of the device according to FIG. 1, arranged on a guide rail.

FIG. 2 is a front view of the article transport device 1, revealing, in particular, the U-shaped design of the transport body 4 and which comprises the base leg 4b and the two side legs 4a, 4d connected fixedly to the base leg 4b. The article transport device 1 is designed symmetrically relative to the axis of symmetry S illustrated. The side legs 4a, 4d each have two axles 3 which run parallel to the transverse direction and which are intended for the rotatable mounting of the wheels 2a, 2b, 2c, 2d. The wheels 2a, 2b, 2c, 2d or the axles 3 are arranged on the opposite sides 4o, 4p of the two side legs 4a, 4d, the respective pairs of wheels 2a, 2b; 2c, 2d being at a distance from one another in the transverse direction in such a way that the guide rail 10, which is illustrated in cross section, comes to rest between the wheels 2a, 2b, 2c, 2d. As is evident from FIG. 2, the upright direction of the legs 4a, 4d is taken to be the direction starting from the base leg 4b and running upward toward the wheels 2a, 2c. The guide rail 10 is designed to be rounded laterally, and each wheel 2a, 2b, 2c, 2d has a transitional region 2f, designed to be adapted to this cross-sectional profile, and a flange 2g, so that the transport device 1 bears, free of play or largely free of play, on the guide rail 10 also with respect to forces which act transversely to the conveying direction F. The transport body 4 has, in the region of the base leg 4b, two fastening points which are designed as openings 4c and at which, for example, a gripper 6, illustrated merely symbolically, for holding a printing product can be fastened. Moreover, the transport body 4 has, on each side leg 4a, 4d, a stub shaft 4e which projects outward perpendicularly to the upright direction of the legs 4a, 4d, and the two stub shafts are coaxial. The wheels 2a, 2b, 2c, 2d are arranged perpendicularly to the profile of the cross section of the guide rail 10 and have a contact face 2e which runs parallel to the surface of the guide rail.

The axles 3 could also be integrally formed directly on the transport body 4. The guide rail 10 and the guide rail engaging members 2 may be produced from diverse materials, so that various material pairings are possible. The guide rail 10 is designed as a continuous closed structure which may also have switchable points.

Figure 3:
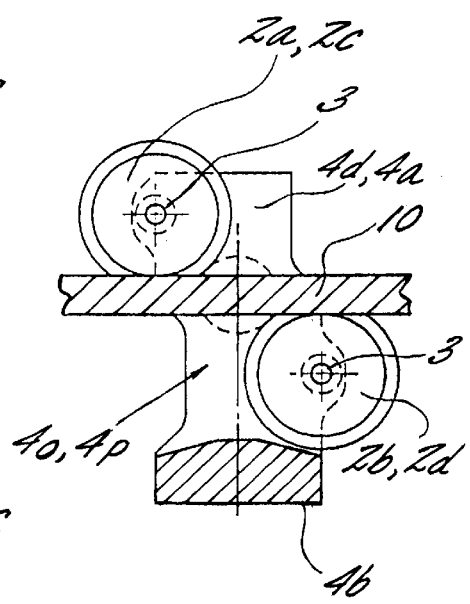
FIG. 3 is a sectional illustration of the device according to FIG. 2 from the direction (A—A) and (B—B)

FIG. 3 is a sectional illustration of the transport device 1 according to FIG. 2 in the viewing direction A—A and in the viewing direction B—B. The wheels 2a, 2c, the wheels 2b, 2d and the run of the legs 4d, 4a are arranged identically from both viewing directions A—A, B—B. The legs 4d, 4a run in each case perpendicularly to the base leg 4b. The wheels 2a, 2b and the wheels 2c, 2d are arranged at a distance from one another in the upright direction of the leg 4d. The two wheels 2a, 2b and the two wheels 2c, 2d bear on the guide rail 10, the two wheels 2a, 2b and the two wheels 2c, 2d in each case being arranged so as to be offset crosswise and diametrically opposite one another.

Figure 4:
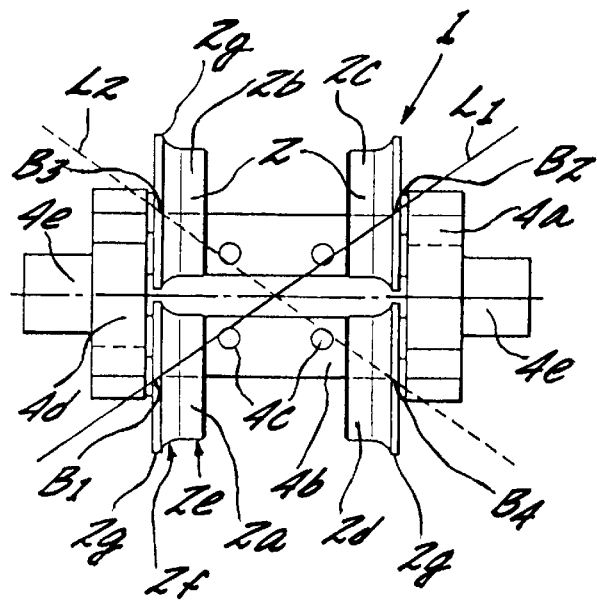
FIG. 4 is a top view of the device according to FIG. 1, with contact points between the flange and the guide rail being marked.

The top view in FIG. 4 of the transport device 1 according to FIG. 1 shows the two pairs of wheels 2a, 2b; 2c, 2d, in each case arranged at a distance from one another in the longitudinal direction of the guide rail 10, and in the transverse direction of the base leg 4b running between the legs 4a, 4d. Moreover, the contact points B1, B2, B3, B4 of the respective flange 2g with the guide rail 10, which is not shown in FIG. 4, are illustrated. The contact points B1, B2; B3, B4 of the wheels 2a, 2c; 2b, 2d arranged diagonally opposite one another in each case are connected by lines L1, L2. In an advantageous arrangement, the wheels 2a, 2b, 2c, 2d are dimensioned and arranged at a distance from one another, in such a way that the lines L1, L2 run perpendicularly or approximately perpendicularly to one another. An advantage of this arrangement is to be seen in that all the forces applied to the transport device 1 generate an approximately equal moment, thus giving the transport device 1 a stable traveling behavior even in the case of forces applied from a variable direction, such as occur, for example, when a curve is being negotiated. The applied moments can be reduced by shortening the lever arm, and, in the case of the present transport device 1, this may be carried out by shortening the length between the contact points B1, B2; B3, B4.

Figure 5:
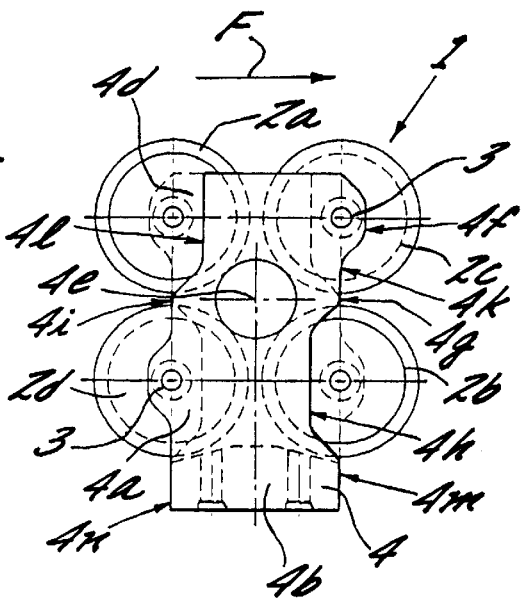
FIG. 5 is a side view of the device according to FIG. 2 from the direction (C—C)

FIG. 5 is a side view of the transport device 1 according to FIG. 2 in the viewing direction C—C. The wheels 2a, 2b, 2c, 2d held rotatably by the axles 3 by the two side legs 4a, 4d are in each case arranged so as to be offset crosswise and diametrically opposite one another in pairs, and as further described above. This arrangement of the wheels 2a, 2b, 2c, 2d makes it possible, inter alia, to have, with respect to the conveying direction F, a very short distance between the wheels 2a, 2b; 2c, 2d arranged in pairs, so that the transport device 1 can have a very short design in the conveying direction F. Moreover, the two side legs 4a, 4d of the transport body 4 are arranged so as to be offset mirror symmetrically in the conveying direction F or in the direction opposite to the conveying direction F, the run of the leg 4a being fully evident and the run of the leg 4d not being directly visible and therefore being illustrated by dashes. This embodiment of the legs 4a, 4d and the arrangement of the wheels 2a, 2b, 2c, 2d on the side legs 4a, 4d makes it possible to ensure that the wheels 2a, 2b, 2c, 2d of the transport device 1 following or preceding on the guide rail 10 do not touch one another.

The two side legs 4a, 4d each have a side edge 4k oriented in the conveying direction F and a side edge 4l oriented opposite to the conveying direction F. The two side legs 4a, 4d are designed in such a way that the side edges 4k, 4l have a contact portion 4g, 4i in the middle region, the run of the side edges 4k, 4l being designed in such a way that, when the guide rail runs in a straight line, two adjacent transport devices 1 touch one another in the contact portion 4g, 4i only. It may prove advantageous to provide, in the region of the base leg 4b, two further contact portions 4m, 4n which may also extend over the entire width of the base leg 4b.

Figure 6:
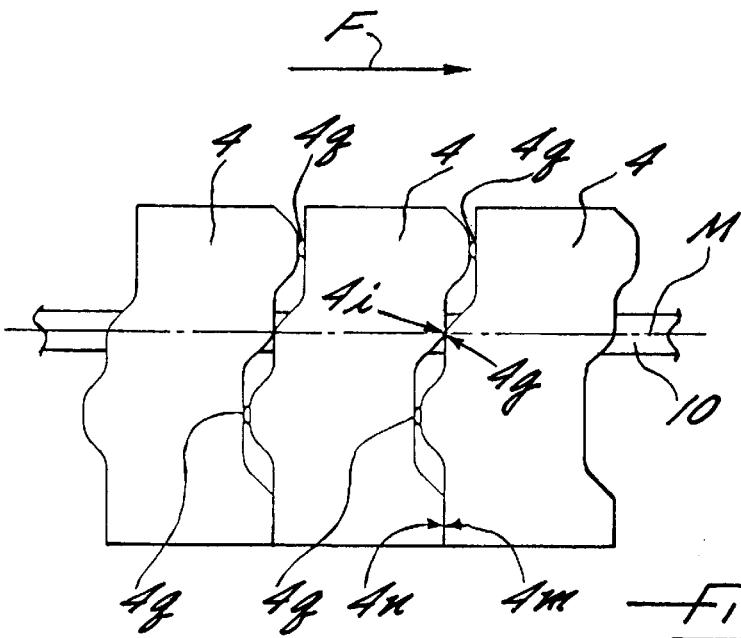
FIG. 6 is a side view of an arrangement of three transport devices pushed together.

FIG. 6 shows three transport devices which are arranged one behind the other in the direction of run F of the conveying rail 10 and which in each case touch one another at the contact portions 4g, 4i, 4m, 4n. For the sake of clarity, only the transport bodies 4 are illustrated, without the wheels 2a, 2b, 2c, 2d, also present of course, being shown. One advantage of the contact portions 4i, 4n; 4g, 4m, arranged so as to be offset in the upright direction of the side legs 4a, 4d, is to be seen in that the impact forces can be transmitted in a relatively uniformly distributed manner to the following adjacent transport body 4. It may prove advantageous for the transport bodies 4 to be additionally provided with a damping element 4q, in order to mitigate the impact occurring when two transport devices 1 bump against one another. The transport devices 1 together with the transport body 4 are preferably designed in such a way that the contact portions 4g, 4i are arranged, with respect to the rail 10, on their center lines M or in the region of the center line M, as is evident from the side view according to FIG. 6. One advantage of this arrangement of the contact portions 4g, 4i is to be seen in that the transport devices 1 touch one another at the contact portions 4g, 4i even when the guide rail 10 runs in an arc. The contact portions 4g, 4i form the most important mutual contact face, in some embodiments even the only contact face between two transport devices 1 arranged one after the other on the guide rail 10.

Figure 7:
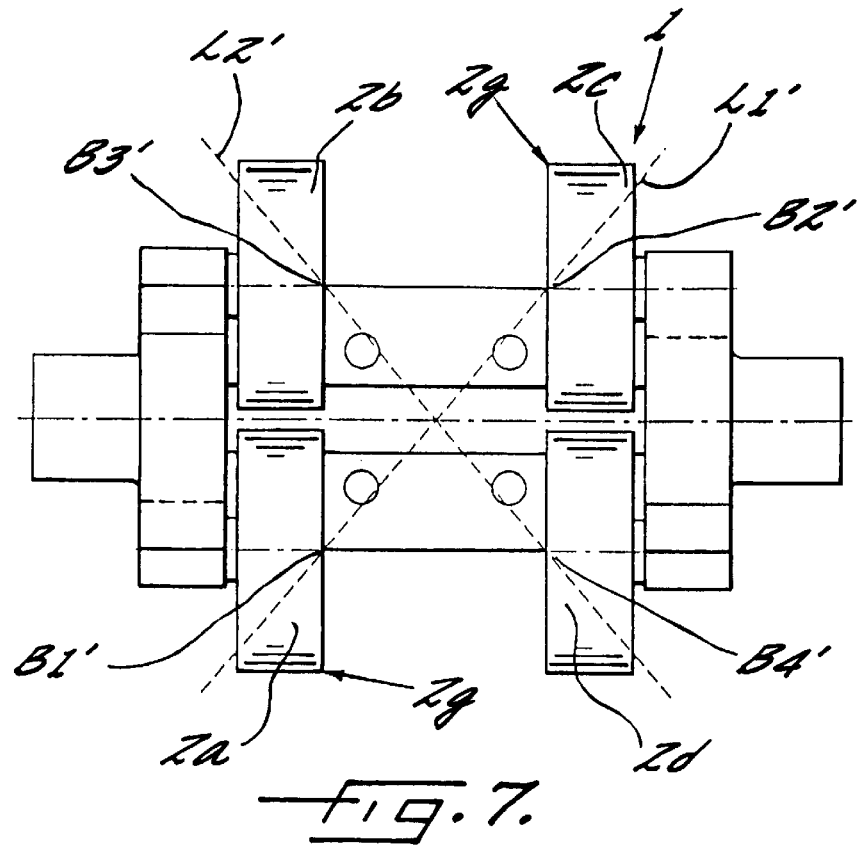
FIG. 7 is a top view of another embodiment of an article transport device, with contact points between the flange and guide rail being marked.

FIG. 7 is a top view of a further embodiment of an article transport device 1, the wheels 2a, 2b, 2c, 2d of which are of cylindrical design, that edge of the wheels 2a, 2b, 2c, 2d which is in each case oriented inward being designed as a flange 2g. The lines L1', L2' once again connect the contact points B1', B2', B3', B4' obtained between the flange 2g and the guide rail 10. Those portions of the lines L1', L2' which run between the contact points B1', B2', B3', B4' are made shorter, as compared with the embodiment according to FIG. 4, so that, with equal forces applied to the transport device 1, lower moments are generated and therefore better guidance properties are achieved.

Figure 8:
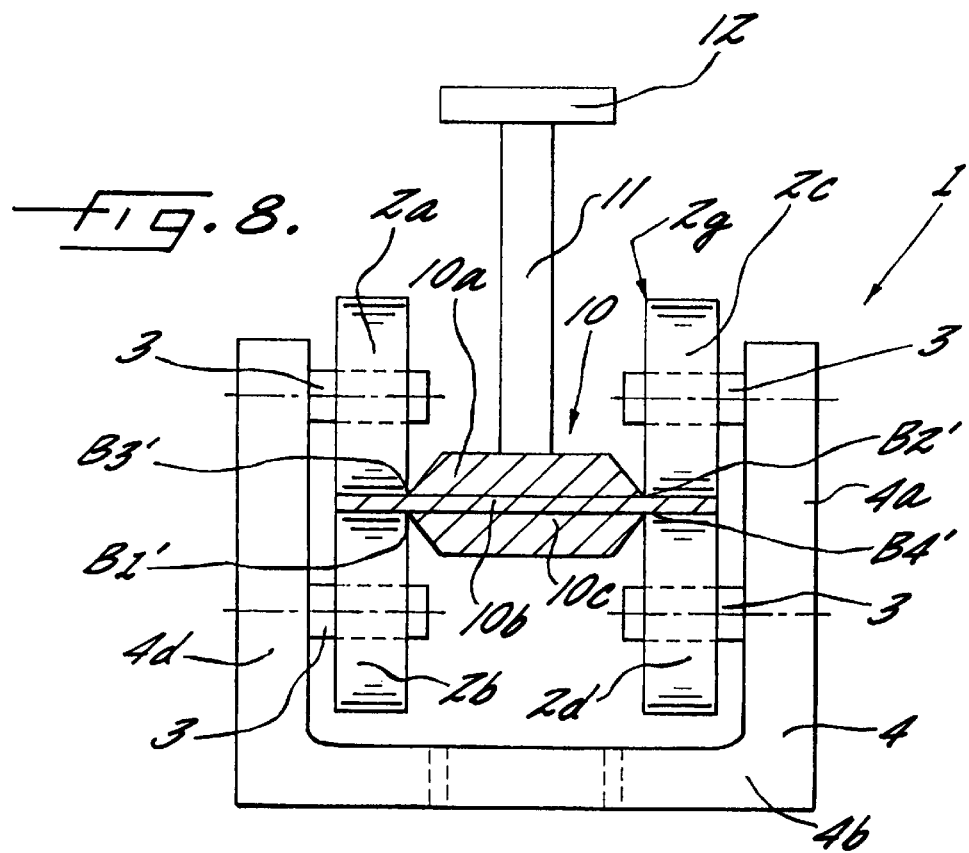
FIG. 8 is a front view of the transport device according to FIG. 7, arranged on a guide rail.

The front view, illustrated in FIG. 8, of the transport device 1 according to FIG. 7 shows a U-shaped transport body 4 with two side legs 4a, 4d running perpendicularly to the base leg 4b. The wheels 2a, 2b, 2c, 2d held rotatably by the axles 3 are of cylindrical design, the edge of which in each case is oriented inward forming a flange 2g. The guide rail 10 comprises a flat member 10b and, in each case, a profile 10a, 10c arranged above and below the latter and composed, for example, of plastic or aluminum. The flange 2g has contact points B1', B3'; B2', B4' with the profiles 10a, 10b. The rail 10 is connected fixedly to a holder 12 via a carrier device 11.

Figure 9:
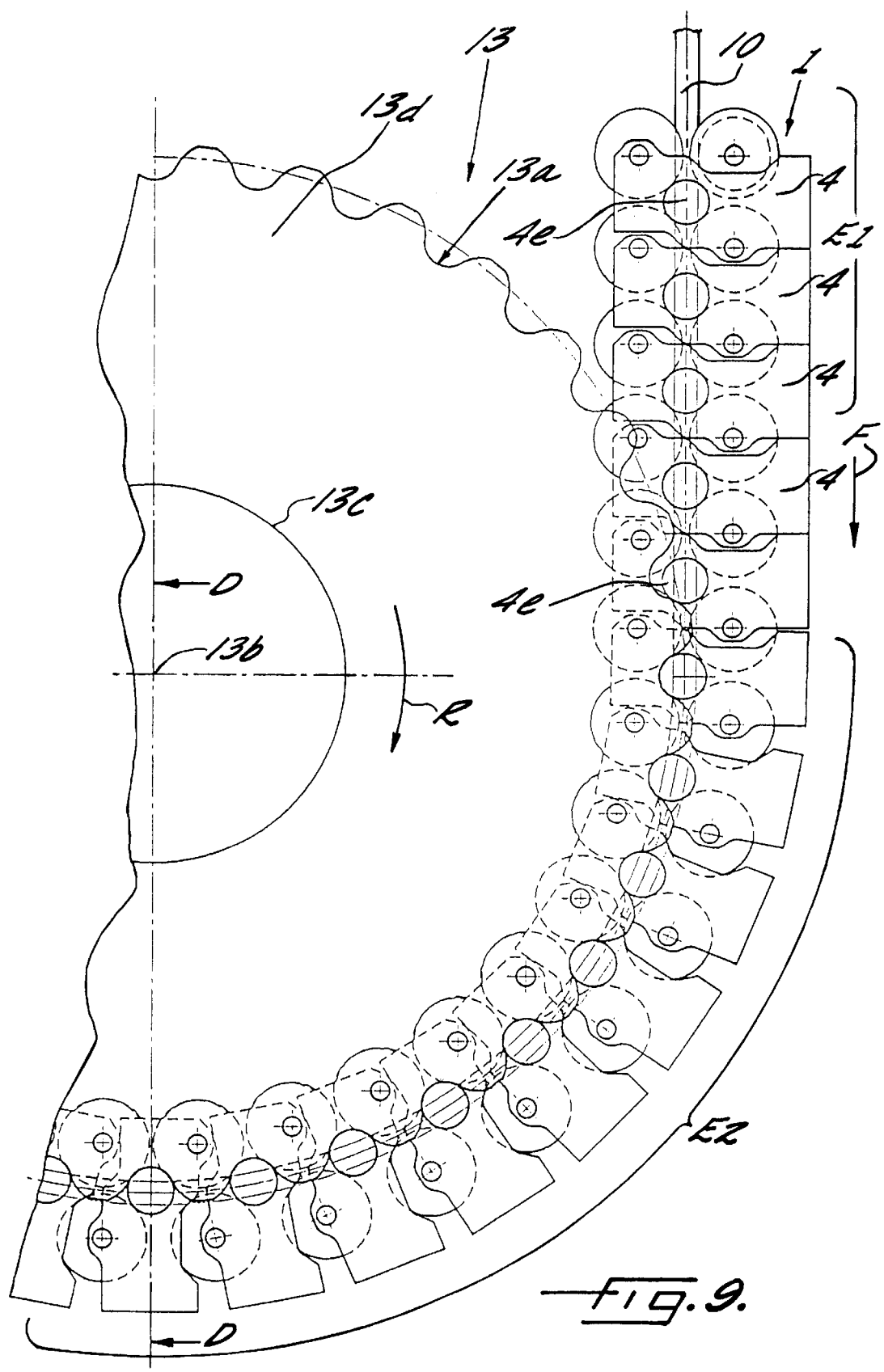
FIG. 9 is a plan view of a conveying system for moving the transport devices.

The plan view of a conveying means 13 according to FIG. 9 shows a guide rail 10 which has a curvature adapted to the circumference of the conveying means 13. The transport devices 1 first enter an introduction region E1, in which they arranged on the guide rail 10 so as to be at a short distance from one another or so as to touch one another. The introduction region E1 preferably has a descending gradient, so that the individual transport devices 1 automatically assume, due to gravity which takes effect, a position in which they touch one another. The conveying means 13 is designed as a gearwheel 13d rotatable in the direction of rotation R about a horizontal axis 13b. The gearwheel 13d has recesses 13a which are arranged so as to be distributed over the circumference and are adapted to the stub shafts 4e and which are in engagement with the stub shafts 4e in the conveying portion E2, so that the transport devices 1, following the run of the guide rail 10, are moved in the conveying direction F. On the left side, not illustrated, of FIG. 9, the guide rail 10 can resume a run in a straight line, so that the transport devices 1 move away from the conveying means 13. Advantageously, that portion of the guide rail 10 which follows the conveying means 13 has an ascending run, so that the individual transport devices 1, by touching one another or by the formation of a chain with loose chain links, are conveyed into a higher position. The guide rail 10 can subsequently have a descending gradient, so that the chain is parted and the transport devices 1, driven by gravity which acts on them, move individually along the guide rail 10. The conveying means 13 is preferably driven in such a way that an uninterrupted chain of successive transport devices 1 bears constantly on the circumference of the gearwheel 13d, so that the transport devices 1, moving continuously, are conveyed upward. A supply of transport devices 1 can be constantly present in the entry portion E1. Moreover, this supply, which forms a buffer, has the advantage that arriving transport devices 1 are braked reliably before they come into engagement with the conveying means 13.

Figure 10:
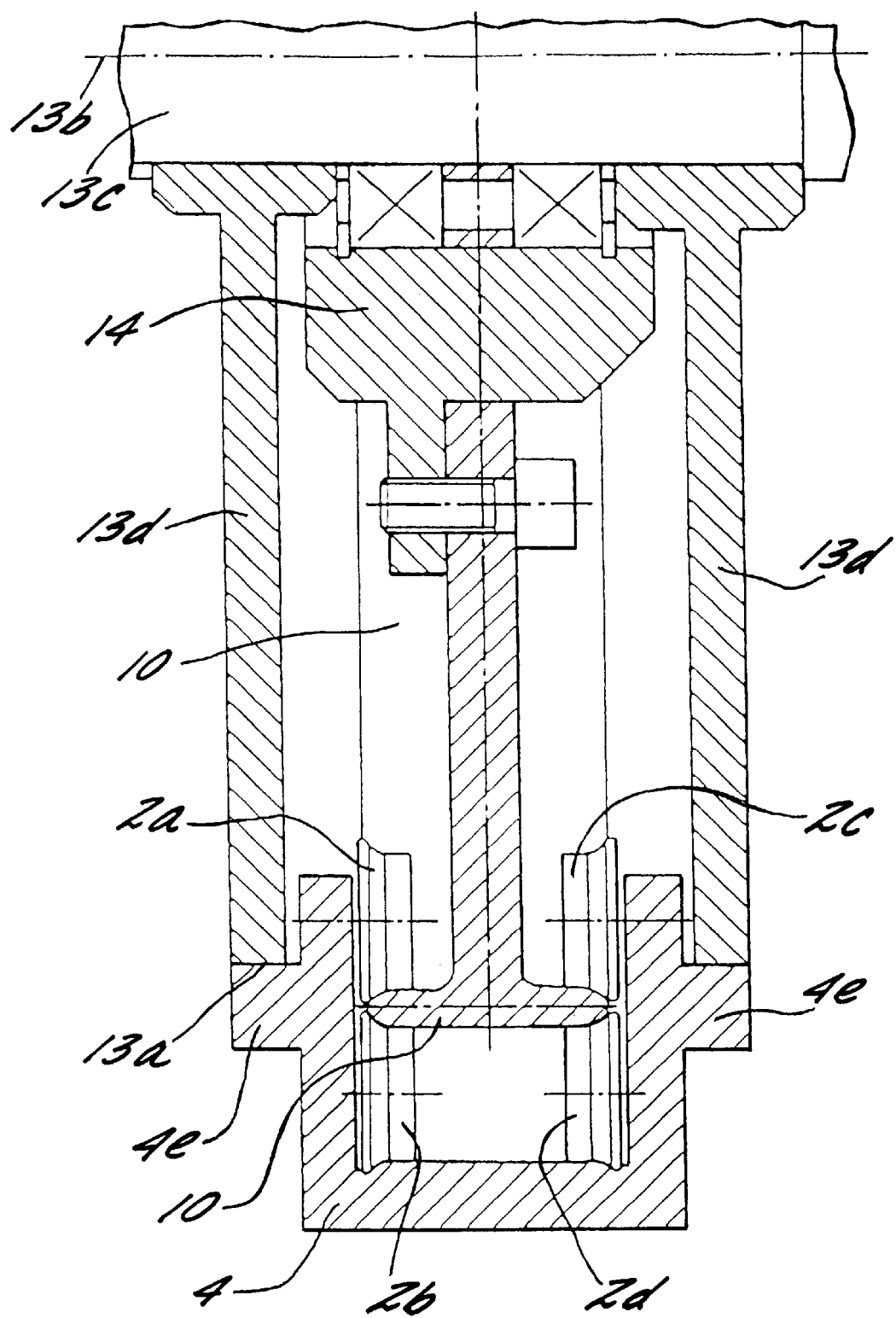
FIG. 10 is a section view through the conveying system according to FIG. 9 along the line D—D.

FIG. 10 shows a section through the conveying means 13 according to FIG. 9 along the line D—D. The guide rail 10 is of T-shaped design, has a curved run and, like the shaft 13c, is held at the center by a fixed support 14. A gearwheel 13d is arranged on each of the two sides of the guide rail 10, said gearwheels, connected fixedly to the shaft 13c, being mounted rotatably about the center of rotation 13b. The recesses 13a and the teeth of the gearwheel 13d surround the stub shafts 4e on both sides and move the transport devices 1 in the conveying direction F.

The conveying means 13 could also be designed in another way, thus, for example, as a hauling drive, in order to convey the transport devices 1 along a guide rail 10 running in a straight line.

Figure 11:
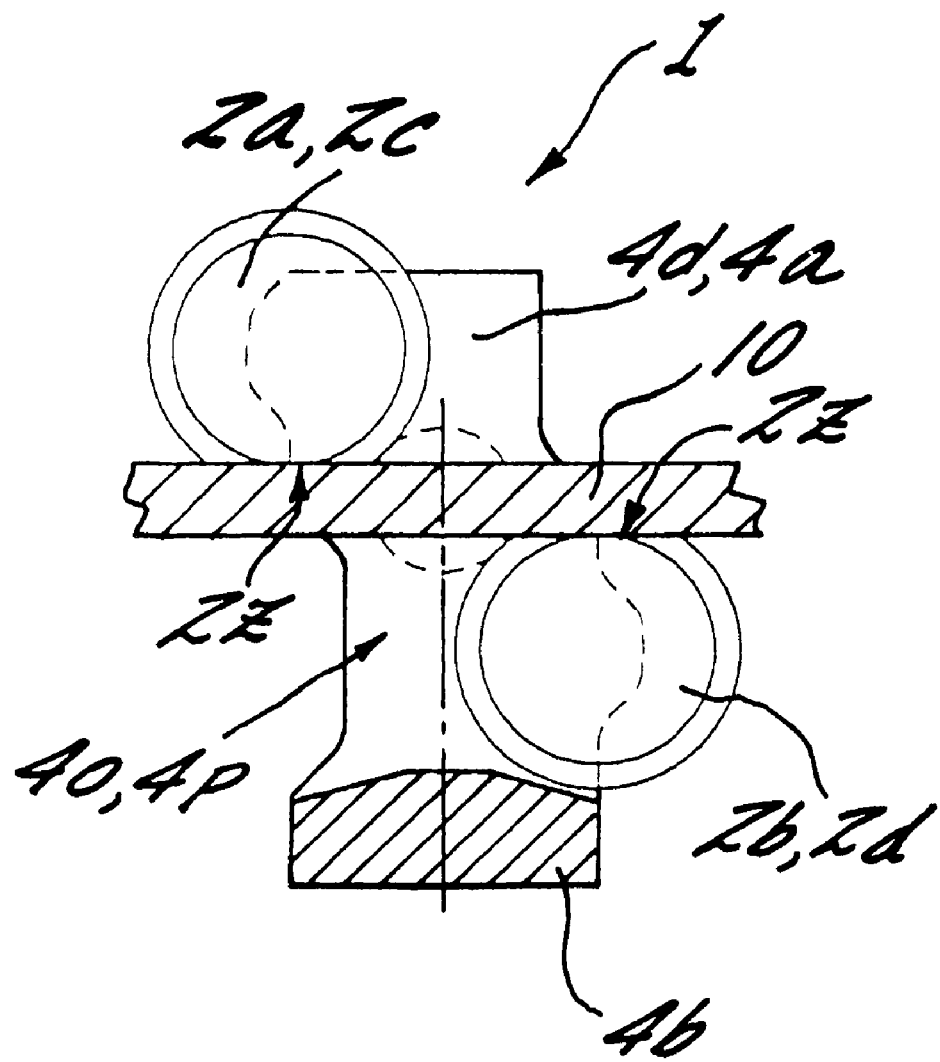
FIG. 11 is a sectional illustration of an article transport device wherein the guide rail engaging members are built as a slide.

FIG. 11 shows a further transport device 1, whereby the sectional illustration of FIG. 11 corresponds to the transport device according to FIG. 2 in the viewing direction A—A and in the viewing direction B—B, except, that the transport device 1 according to FIG. 11 has no axles 3 and the wheels 2a, 2b, 2c, 2d are connected to the side legs 4a, 4d in such a way, that the wheels 2a, 2b, 2c, 2d are fixed and that they can not rotate. Therefore, the transport device 1 is built as a slide whereby the wheels 2a, 2b, 2c, 2d have a part that forms a runner or skid 2z to slide along the guide rail 10.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. An article transport device adapted to be supported for movement along a guide rail, comprising a generally U-shaped body comprising a base leg and two side legs extending in an upright direction from the base leg, with the base leg defining a transverse direction extending between the two side legs and a longitudinal direction which is perpendicular to the transverse direction and to the upright direction, and with the side legs having respective inside surfaces which face each other in the transverse direction, and a pair of guide rail engaging members mounted to the inside surface of each of said side legs, with each pair of guide rail engaging members being offset from each other in both the longitudinal and upright directions so as to define a leading member and a trailing member, with the leading members of the two pairs being substantially aligned and spaced apart from each other in the upright direction so as to be adapted to closely receive a guide rail therebetween, and with the trailing members of the two pairs being longitudinally spaced from the leading members and substantially aligned and spaced apart from each other in the upright direction so as to be adapted to closely receive the guide rail therebetween, and wherein said guide rail engaging members each comprise a slide which is configured to slide along the guide rail.

2. The article transport device as defined in claim 1 wherein said base leg includes a fastening point for fastening an article thereto.

3. The article transport device as defined in claim 1 wherein the pairs of guide rail engaging members are configured and arranged in a mirror image relationship when viewed in opposite transverse directions respectively.

4. The article transport device as defined in claim 1 wherein said side legs of said body have respective outside surfaces which face oppositely from said inside surfaces, and wherein at least one of said side legs includes a stub shaft which extends from the outside surface of the one side leg in the transverse direction.

5. An article transport assembly, comprising a guide rail defining an article path of travel, an article transport device mounted for movement along said guide rail and comprising (a) a generally U-shaped body comprising a base leg and two side legs extending in an upright direction from the base leg, with the base leg defining a transverse direction extending between the two side legs and a longitudinal direction which is perpendicular to the transverse direction and to the upright direction, and with the side legs having respective inside surfaces which face each other in the transverse direction, and (b) a pair of guide rail engaging members mounted to the inside surface of each of said side legs, with each pair of guide rail engaging members being offset from each other in both the longitudinal and upright directions so as to define a leading member and a trailing member, with the leading members of the two pairs being substantially aligned and spaced apart from each other in the upright direction and closely receiving the guide rail therebetween, and with the trailing members of the two pairs being longitudinally spaced from the leading members and substantially aligned and spaced apart from each other in the upright direction and closely receiving the guide rail therebetween, wherein each of said guide rail engaging members comprises a wheel mounted to the associated side leg adjacent the inside surface thereof and for rotation about an axis extending in said transverse direction, and wherein each wheel has a flange which conforms to the cross sectional profile of the guide rail.

6. The article transport assembly as defined in claim 5 wherein the wheels are of generally cylindrical configuration, and wherein each wheel includes a side face which opposes the opposite side leg and which forms said flange.

7. The article transport assembly as defined in claim 6 wherein each flange is in contact with the guide rail at a contact point (B1,B2,B3,B4), and wherein, when viewed in plan, the wheels define two lines (L1,L2) connecting the contact points of diagonally opposite wheels, and wherein the two lines are approximately perpendicular to each other.

8. The article transport assembly as defined in claim 6 wherein each side leg defines an outside surface which faces opposite the inside surface and includes a stub shaft which extends from the outside surface in a transverse direction.

9. An article transport assembly, comprising a guide rail defining an article path of travel, an article transport device mounted for movement along said guide rail and comprising (a) a generally U-shaped body comprising a base leg and two side legs extending in an upright direction from the base leg, with the base leg defining a transverse direction extending between the two side legs and a longitudinal direction which is perpendicular to the transverse direction and to the upright direction, and with the side legs having respective inside surfaces which face each other in the transverse direction, and (b) a pair of guide rail engaging members mounted to the inside surface of each of said side legs, with each pair of guide rail engaging members being offset from each other in both the longitudinal and upright directions so as to define a leading member and a trailing member, with the leading members of the two pairs being substantially aligned and spaced apart from each other in the upright direction and closely receiving the guide rail therebetween, and with the trailing members of the two pairs being longitudinally spaced from the leading members and substantially aligned and spaced apart from each other in the upright direction and closely receiving the guide rail therebetween, wherein each of said guide rail engaging members comprises a slide which is configured to slide along said guide rail.

10. An article transport assembly, comprising a guide rail defining an article path of travel, an article transport device mounted for movement along said guide rail and comprising (a) a generally U-shaped body comprising a base leg and two side legs extending in an upright direction from the base leg, with the base leg defining a transverse direction extending between the two side legs and a longitudinal direction which is perpendicular to the transverse direction and to the upright direction, and with the side legs having respective inside surfaces which face each other in the transverse direction, and (b) a pair of guide rail engaging members mounted to the inside surface of each of said side legs, with each pair of guide rail engaging members being offset from each other in both the longitudinal and upright directions so as to define a leading member and a trailing member, with the leading members of the two pairs being substantially aligned and spaced apart from each other in the upright direction and closely receiving the guide rail therebetween, and with the trailing members of the two pairs being longitudinally spaced from the leading members and substantially aligned and spaced apart from each other in the upright direction and closely receiving the guide rail therebetween, and wherein each side leg defines an outside surface which faces opposite the inside surface and includes a stub shaft which extends from the outside surface in a transverse direction.

11. The article transport assembly as defined in claim 10 wherein the stub shafts of the two side legs are coaxially aligned.

12. The article transport assembly as defined in claim 10 wherein each side leg defines a first side edge which faces in the longitudinal direction and a second side edge which faces in the opposite direction, and mating contact surfaces on the respective side edges so that two of the article transport devices mounted on the guide rail contact solely at the mating contact surfaces.

13. The article transport assembly as defined in claim 10 further comprising means for conveying a plurality of said article transport devices along said guide rail.

14. The article transport assembly as defined in claim 13 wherein said conveying means comprises a gear wheel which is configured for engaging said stub shafts of each article transport device.

15. An article transport assembly, comprising
a guide rail defining an article path of travel,
an article transport device mounted for movement along said guide rail and comprising (a) a generally U-shaped body comprising a base leg and two side legs extending in an upright direction from the base leg, with the base leg defining a transverse direction extending between the two side legs and a longitudinal direction which is perpendicular to the transverse direction and to the upright direction, and with the side legs having respective inside surfaces which face each other in the transverse direction, and (b) a pair of wheels mounted to the inside surface of each of said side legs for rotation about an axis extending in the transverse direction, with each pair of wheels being offset from each other in both the longitudinal and upright directions so as to define a leading wheel and a trailing wheel, with the leading wheels of the two pairs being substantially aligned and spaced apart from each other in the upright direction and closely receiving the guide rail therebetween, and with the trailing wheels of the two pairs being longitudinally spaced from the leading wheels and substantially aligned and spaced apart from each other in the upright direction and closely receiving the guide rail therebetween, said guide rail including upper and lower flat surfaces along each side edge thereof, and a profile arranged between the flat surfaces on at least one of the upper and lower sides thereof, and wherein said wheels are of generally cylindrical configuration, with each wheel engaging one of the upper and lower flat surfaces and including a side face which opposes the opposite side leg, and with the side face of at least two of the wheels on opposite side legs defining a peripheral edge portion which contacts the profile so as to guide the article transport device in its movement along the guide rail.

16. The article transport assembly as defined in claim 15 wherein a profile is arranged between the upper flat surfaces and a second profile is arranged between the lower flat surfaces, and wherein each of the wheels has a peripheral edge portion which contacts an adjacent profile.

17. The article transport assembly as defined in claim 16 wherein the peripheral edge portion of each wheel is in contact with the guide rail at a contact point (B1, B2, B3, B4), and wherein, when viewed in plan, the wheels define two lines (L1, L2) connecting the contact points of diagonally opposite wheels, and wherein the two lines are approximately perpendicular to each other.

* * * * *

UNITED STATES PATENT AND TRADEMARK OFFICE
CERTIFICATE OF CORRECTION

PATENT NO. : 5,983,803

DATED : November 16, 1999

INVENTOR(S) : Eberle

It is certified that error appears in the above-identified patent and that said Letters Patent is hereby corrected as shown below:

Column 8, line 33, "claim 6" should read --claim 5--.

Signed and Sealed this

Fifteenth Day of August, 2000

Attest:

Q. TODD DICKINSON

Attesting Officer

Director of Patents and Trademarks